United States Patent

Stetson, Jr.

Patent Number: 5,582,368
Date of Patent: Dec. 10, 1996

[54] REACTION WHEEL SPEED OBSERVER SYSTEM

[75] Inventor: John B. Stetson, Jr., New Hope, Pa.

[73] Assignee: Martin Marietta Corp., East Windsor, N.J.

[21] Appl. No.: 376,507

[22] Filed: Jan. 23, 1995

[51] Int. Cl.$^6$ .................. B64G 1/24; B64G 1/36
[52] U.S. Cl. .................. 244/165; 244/171; 244/176
[58] Field of Search .................. 244/75, 164, 165, 244/171, 176

[56] References Cited

U.S. PATENT DOCUMENTS

| | | | |
|---|---|---|---|
| 3,968,352 | 7/1976 | Andeen | 244/164 |
| 4,537,375 | 8/1985 | Chan | 244/171 |
| 5,021,745 | 6/1991 | Stetson, Jr. | 244/165 |
| 5,201,833 | 4/1993 | Goodzeit et al. | 244/165 |

*Primary Examiner*—Andres Kashnikow
*Assistant Examiner*—Virna Lissi Mojica
*Attorney, Agent, or Firm*—W. H. Meise; C. A. Berard; S. A. Young

[57] ABSTRACT

A spacecraft (10) includes and attitude sensor (16) for generating sensed attitude signals. A controllable drive arrangement (238) is coupled to a reaction wheel (46), for driving it in response to speed error signals. The drive results in changes in reaction wheel speed. The spacecraft has a digital speed sensor (248) coupled to the reaction wheel, for generating quantized speed signals. A reaction wheel speed error signal generator (234) produces speed error signals in response to the difference between the attitude command and the sensed attitude signals, corrected by signals responsive to the speed of the reaction wheel, whereby at low reaction wheel speeds, the quantization causes attitude errors. A speed quantization correction arrangement (250) is coupled to the digital speed sensor (248) and to the reaction wheel speed error signal generator (234), for adding noise to the quantized speed signals, for thereby generating dithered wheel speed signals, and for filtering the dithered wheel speed signals with a low pass characteristic, for generating quantization corrected speed signals responsive to the speed of the reaction wheel. The filtered noise smooths the wheel speed quantization steps, thereby stabilizing the control loops.

5 Claims, 4 Drawing Sheets

5,582,368

1

REACTION WHEEL SPEED OBSERVER SYSTEM

FIELD OF THE INVENTION

This invention relates to spacecraft attitude control systems, and more particularly to such systems in which reaction wheels are used for attitude control, and in which digital speed sensors are used to determine the wheel speed.

BACKGROUND OF THE INVENTION

Modern spacecraft may be required to point more precisely than in the past, in order to accomplish their missions. Often, the reason for maintaining high pointing accuracy is so that a payload, such as an antenna or an optical instrument, may be accurately directed toward a particular feature or location.

FIG. 1 is a simplified perspective or isometric view of a spacecraft 8 orbiting the Earth 12. Spacecraft 8 includes a body 10, which supports an attitude sensor 16. Attitude sensor 16 generates signals representative of at least the pitch (y) attitude of body 10. Spacecraft body 10 carries a reaction wheel 46, which is mechanically driven by a motor 42.

FIG. 2 is a simplified block diagram of a control system 210, which controls motor 42, and thereby reaction wheel 46, in response to attitude signals from sensor 16 and attitude command signals from a source (not illustrated). Elements of FIG. 2 corresponding to those of FIG. 1 are designated by like reference numbers. In FIG. 2, attitude commands are applied over a signal path 212 to the non-inverting (+) input port of a subtracting circuit 214. Sensed attitude signals are applied from attitude sensor 16, by way of a signal path 218, to an inverting (−) input port of subtracting circuit 214. Attitude error signals are produced at the output of subtracting circuit 214, and are applied to a compensation circuit illustrated as a block 220. Compensation block 220 acts on the attitude error signals in a manner known in the art. One simple form of compensation is multiplication by a gain factor $K_1$. But other forms of compensation are well known. The compensated attitude error signals at the output of compensation block 220 are applied by way of a path 222 to a non-inverting input port of a summing circuit 224, and to an ideal reaction wheel simulator 226. Summing circuit 224 converts the compensated attitude error signals into speed error signals, as described in more detail below.

The speed error signals at the output of 224 of FIG. 2 are applied by way of a path 236 to a reaction wheel driving block 238. Block 238 includes a driver illustrated as an amplifier 240, and also includes motor 42. Motor 42 is mechanically connected to reaction wheel 46, as described in conjunction with FIG. 1, and as suggested by path 244 in FIG. 2.

Reaction wheel 46 is torqued by motor 42 in response to speed error signals applied by block 238, and effects spacecraft body torquing. The spacecraft body torquing in turn, affects the spacecraft body attitude, which changes the attitude sensed by sensor 16, in such a manner as to tend to reduce the attitude error.

Imperfections in reaction wheel 46 such as electrical and mechanical losses, tend to cause the wheel speed errors to deviate from the commanded wheel speed. The wheel speed errors, in turn, result in incorrect body torques and consequent attitude errors. As described in U.S. Pat. No. 5,201,

2

833, issued Apr. 13, 1993 in the name of Goodzeit et al., the reaction wheel speed is corrected by controls associated with an ideal wheel simulator. In FIG. 2, compensated attitude error signals are applied to a ideal wheel simulator 226, which produces ideal wheel speed signals on a path 228. In general, reaction wheel speed, as measured by digital speed sensor 248, is compared in a subtractor 230 with the ideal wheel speed signals and the differences between the actual and ideal wheel speeds is summed in a summer 224 with the compensated attitude error signals. More particularly, the ideal wheel speed signals produced by simulator 226 are applied to the noninverting input port of subtractor 230, and digital speed signals responsive to the actual reaction wheel speed are applied to its inverting input port. The resulting wheel speed difference signal (an error signal), representing the difference between the actual wheel speed and what it "should" be, are applied by way of a path 231 and a compensation network, illustrated as a block 232, and a path 233, to an input port of summing circuit 224. The wheel speed error signals are summed with the attitude error signals to produce the reaction wheel drive signals on signal path 236. The presence of the ideal wheel simulator changes the attitude error signals into reaction wheel speed error signals in summing circuit 224.

Most modern spacecraft attitude control systems are implemented by means of digital hardware and software. Hardware restrictions preclude the quantization (step size) of the digital speed sensor (248) from being as small as the quantization step size of other portions of the attitude control system. It has been discovered that, as the reaction wheel speed decreases toward zero, the effective size of the quantized speed signals produced by the digital speed sensor (248) becomes proportionally larger. Thus, as wheel speeds approach zero wheel speed, the sensed wheel speed increasingly deviates from the actual value. As a result, the difference signal produced by subtracting circuit 230 on signal path 231 is the difference between two numbers, one of which may be grossly in error. Thus, the difference itself may also be grossly in error. The effects of such errors is a tendency toward excessive reaction wheel motor heating, and control loop instability. These effects are undesirable. An improved spacecraft attitude control system is desired.

SUMMARY OF THE INVENTION

A spacecraft, according to the invention includes a body, and attitude sensing means mounted on the body, for generating sensed attitude signals representative of the attitude of said body. A reaction wheel is mounted on the body, for rotation relative thereto. A controllable drive arrangement is coupled to the reaction wheel, for driving the reaction wheel in response to speed error signals. The driving of the reaction wheel results in changes in reaction wheel speed. The spacecraft also includes a digital speed sensing arrangement coupled to the reaction wheel, for generating quantized speed signals representative of the actual reaction wheel speed. A reaction wheel speed error signal generator is coupled to the controllable drive arrangement, to the attitude sensing arrangement, to the digital speed sensing arrangement, and to receive an attitude command, for generating the speed error signal in response to the difference between the attitude command and the sensed attitude signals, corrected by signals responsive to the speed of the reaction wheel, whereby at low reaction wheel speeds, the quantization causes attitude errors. A speed quantization correction arrangement is coupled to the digital speed sensing arrangement and to the reaction wheel speed error signal generator, for adding noise to the quantized speed signals, for thereby generating dithered wheel speed signals, and for filtering the dithered wheel speed signals with a low pass characteristic, for generating quantization corrected speed signals responsive to the speed of the reaction wheel.

In a particular embodiment of the invention, the reaction wheel speed error signal generator includes a first subtractor coupled to the attitude sensor, for subtracting the sensed attitude signals from the attitude command, for generating attitude error signals. An ideal wheel speed simulator is coupled to the first subtractor, and is responsive to the attitude error signals, for generating ideal wheel speed signals, which are representative of the speed which an ideal, frictionless reaction wheel would attain in response to the attitude error signals. A second subtractor is coupled to the ideal wheel speed simulator and to the speed quantization corrector, for subtracting the quantization corrected speed signals from the ideal wheel speed signals, for thereby generating wheel speed correction signals. A first summer is coupled to the first subtractor:, to the second subtractor, and to the controllable drive arrangement, for summing together the wheel speed correction signals with the attitude error signals, for generating the wheel drive signals, with a polarity selected for degenerative control.

In another embodiment of the invention, the spacecraft further includes first and second compensators coupled to the first and second subtractors for compensating the attitude error signals and the wheel speed correction signals, respectively.

The speed quantization corrector may include a noise generator for generating noise signals, and a summing circuit coupled to the digital speed sensor and to the noise generator, for summing the noise signals with the quantized speed signals for generating the dithered wheel speed signals, and may also include a low pass filter coupled to the summing circuit, for low pass filtering the dithered wheel speed signals, to thereby generate the quantization corrected speed signals.

DESCRIPTION OF THE INVENTION

Figure 1:
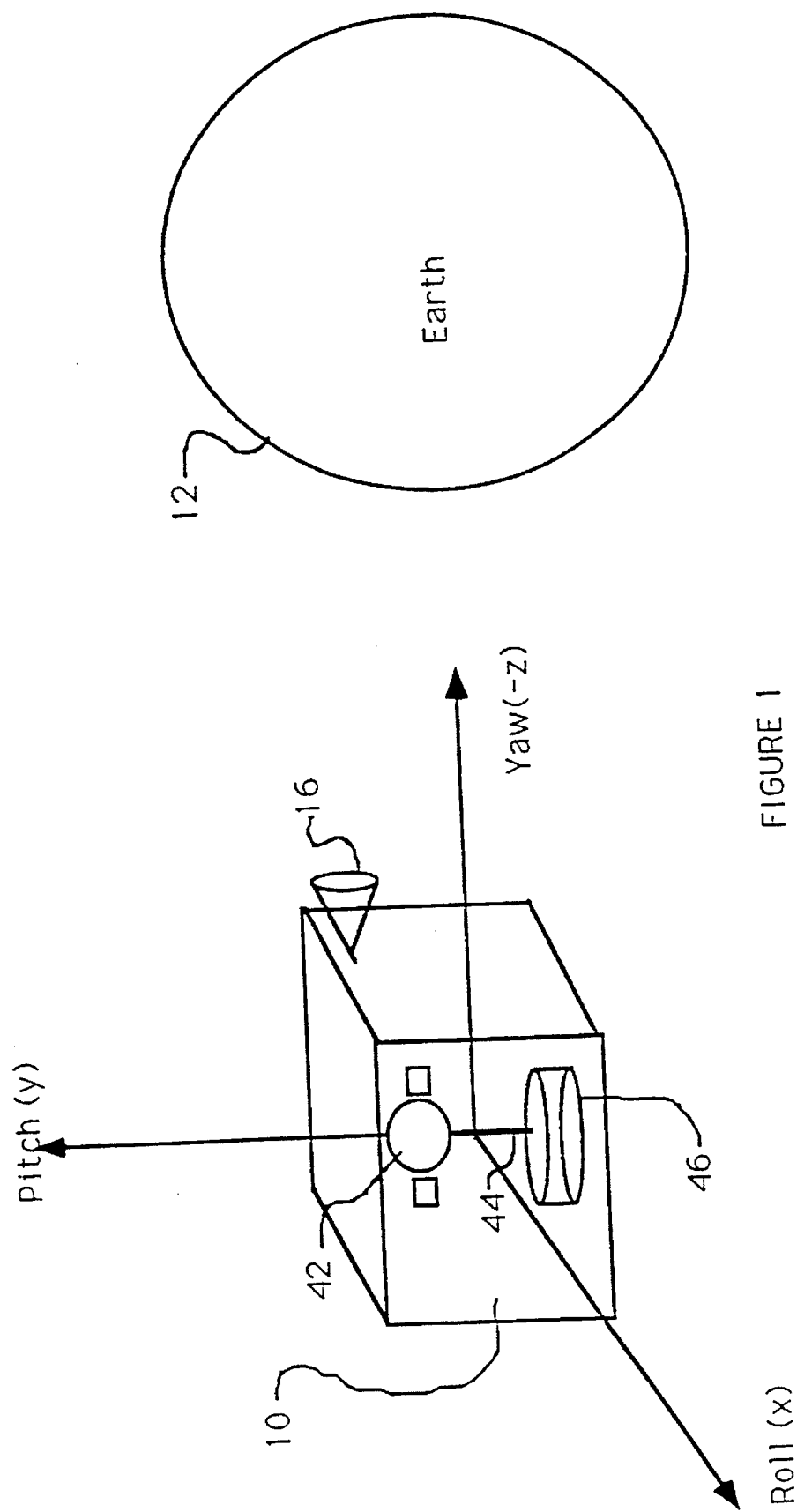
FIG. 1 is a perspective or isometric view of a spacecraft including an attitude sensor and a reaction wheel.
Figure 2:
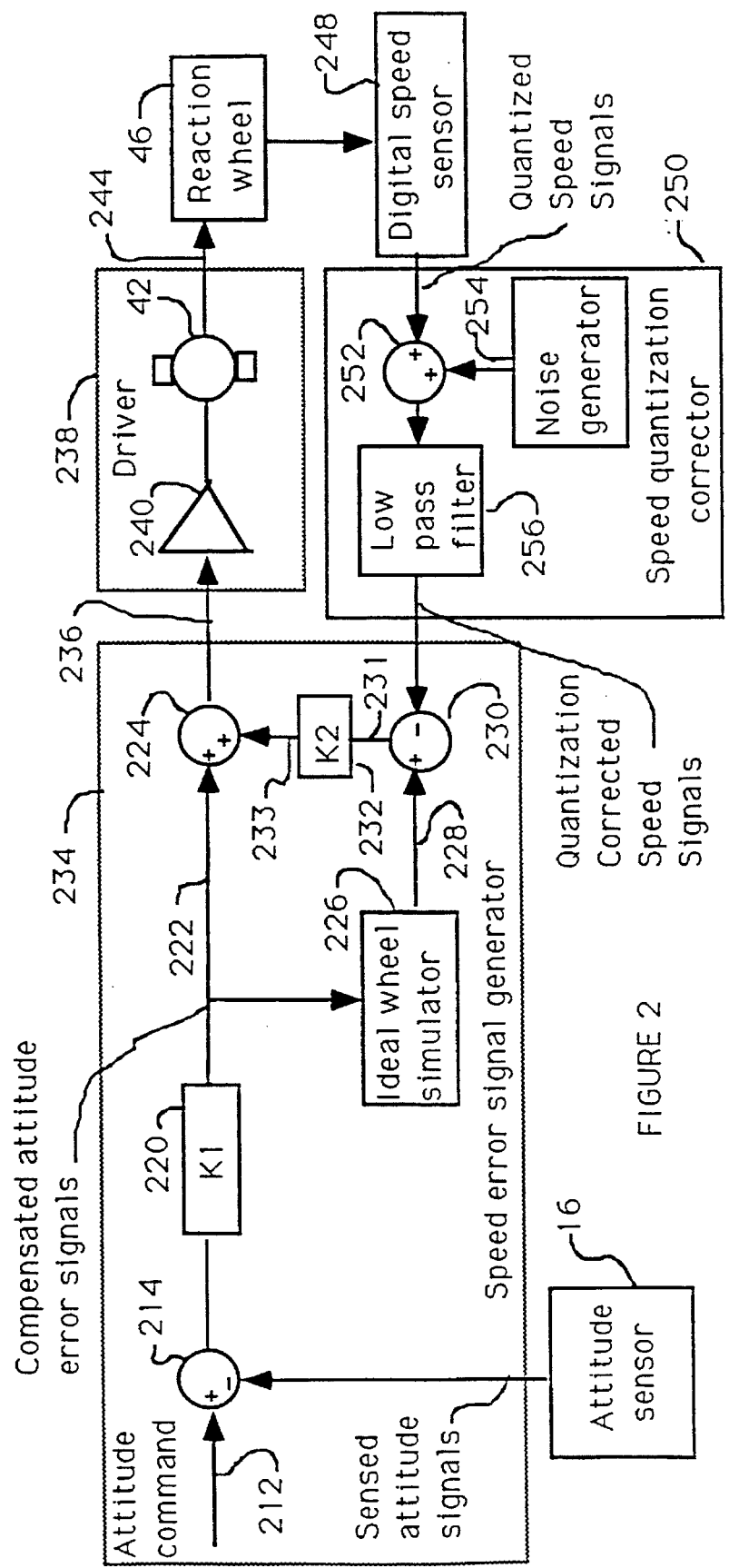
FIG. 2 is a simplified block diagram of an attitude control system according to the invention.

In accordance with the invention, the quantized speed signals at the output of digital speed sensor 248 of FIG. 2 are applied to a speed quantization corrector 250, for generating quantization corrected speed signals, which are applied to the inverting input port of subtracting circuit 230 of speed error signal generator 234. Speed quantization corrector 250 includes a summing circuit 252 which receives random noise signals from a noise generator 254, to thereby generate dithered wheel speed signals, and which low-pass filters the dithered wheel speed signals in a low pass filter 256 to produce quantization corrected speed signals. In a preferred embodiment of the invention, noise generator 254 produces white noise. However, it is believed that other types of noise will be acceptable so long as the RMS noise amplitude is about equal to the magnitude of the smallest wheel speed quantization step, the noise is zero mean, and the noise bandwidth substantially exceeds the passband of low pass filter 256.

It is believed that the summation of the digital noise signals from noise generator 254 with the coarsely quantized speed signals generates the dithered wheel speed signals with values lying between the coarse quantization steps. When filtered, these values more closely approximate the actual wheel speed, and thereby result in more accurate and stable control.

Figure 3:
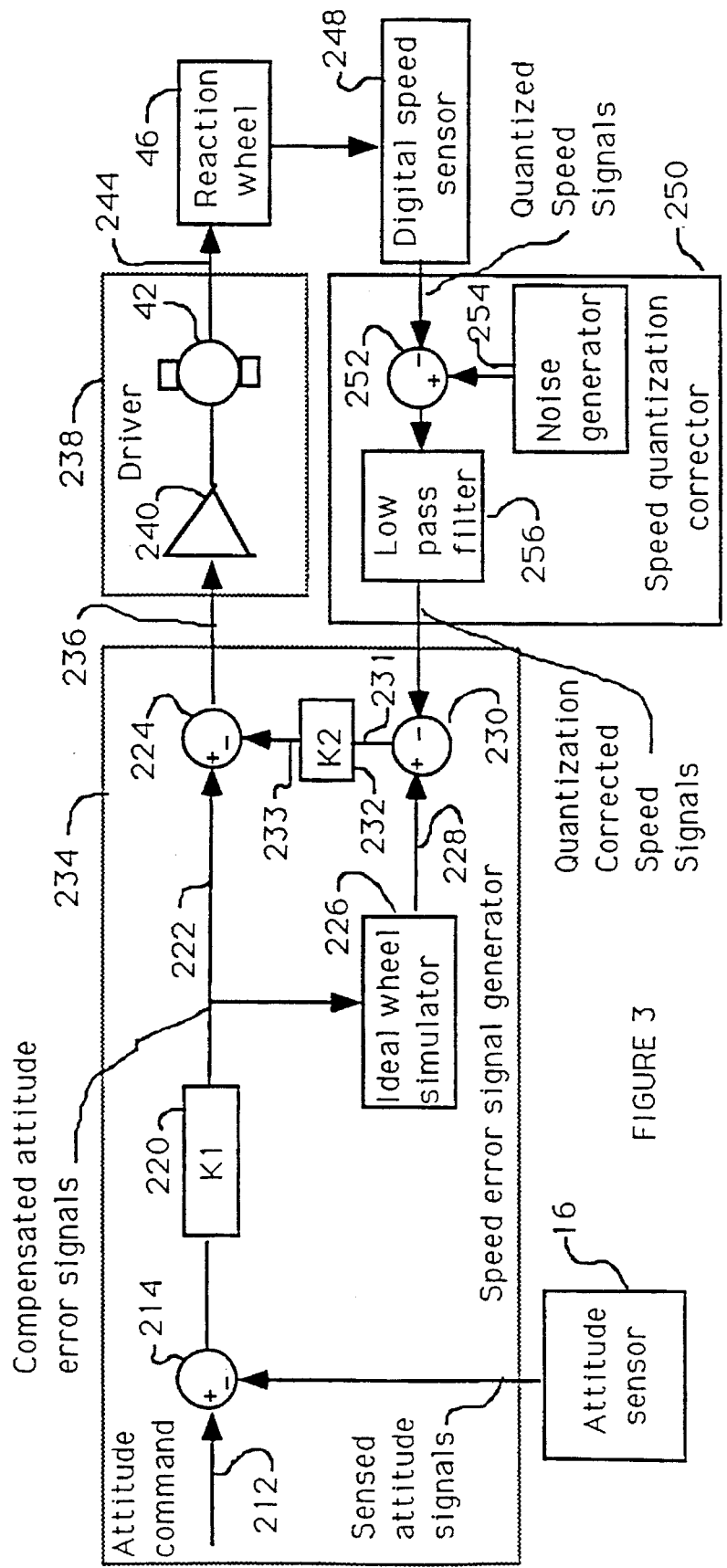
FIG. 3 is a simplified block diagram similar to FIG. 2, in which polarities of various summing elements have been adjusted to maintain a degenerative feedback condition.

FIG. 3 is identical to FIG. 2, except in that summing circuit 252 has been changed to a subtracting circuit, and the degenerative nature of the control loop has been maintained by changing summing circuit 224 into a subtracting circuit.

Figure 4:
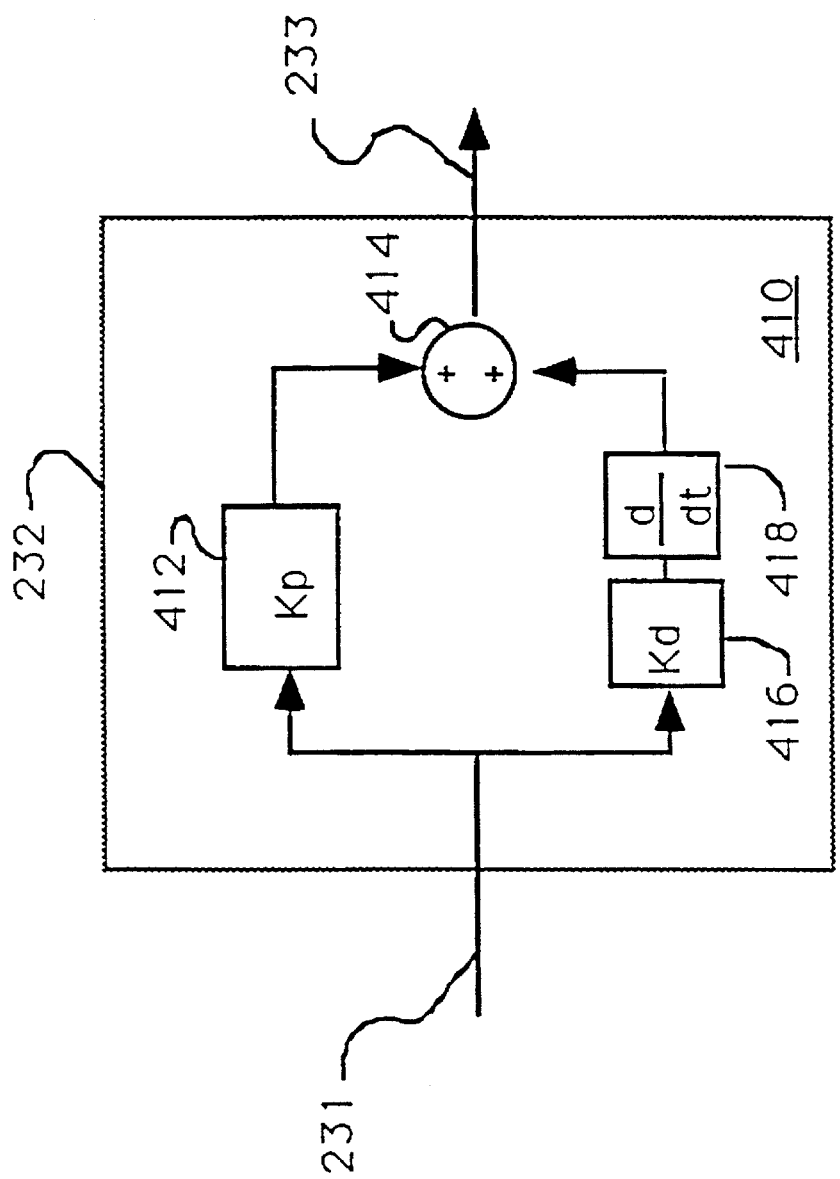
FIG. 4 is a simplified block diagram of a particular compensation block of the arrangement of FIG. 2.

FIG. 4 is a simplified block diagram of a compensator which may be used in place of a simple multiplier in block 232 of FIG. 2. In FIG. 4, the wheel speed difference signal is applied over signal path 231 to the inputs of block 412 and 416. Block 412 represents a multiplication by a proportionality factor, Kp, block 416 represents multiplication by a second proportionality factor, Kd and block 418 represents the time derivative of the weighted speed difference signal. The weighted speed difference signal from block 412 and the weighted time derivative signal from block 418 are summed together in a summing circuit 414, and the resulting sum is applied to signal path 233. The arrangement of FIG. 4 adds high frequency amplification to the existing propotional signal, which in a closed loop context tends to provide damping.

Other embodiments of the invention will be apparent to those skilled in the art. For example, while the elements of FIG. 2 have been described as being digital in nature, the invention is equally applicable to analog circuits except for the digital speed sensor. In addition, while only one axis has been described, the invention may be applied to each of three mutually perpendicular axes (or more than threemutually skewed axes).

What is claimed is:

1. A spacecraft, comprising:

a body;

attitude sensing means for generating sensed attitude signals representative of the attitude of said body;

a reaction wheel mounted on said body for rotation relative thereto;

controllable drive means coupled to said reaction wheel for driving said reaction wheel in response to speed error signals, which result in changes in reaction wheel speed;

digital speed sensing means coupled to said reaction wheel for generating quantized speed signals representative of the actual reaction wheel speed;

reaction wheel speed error signal generating means coupled to said controllable drive means, to said attitude sensing means to said digital speed sensing means, and to an attitude command, for, generating said speed error signal in response to the difference between said attitude command and said sensed attitude signals, corrected by signals responsive to the speed of said reaction wheel, whereby at low reaction wheel speeds, said quantization causes attitude errors;

speed quantization correction means coupled to said digital speed sensing means and to said reaction wheel speed error signal generating means, for adding noise to said quantized speed signals for generating dithered wheel speed signals, and for filtering said dithered wheel speed signals with a low pass characteristic for generating quantization corrected speed signals responsive to the speed of said reaction wheel.

2. a spacecraft according to claim 1, wherein said reaction wheel speed error signal generating means comprises:

first subtracting means coupled to said attitude sensing means, for subtracting said sensed attitude signals from said attitude command, for generating attitude error signals;

ideal wheel speed simulation means coupled to said first subtracting means, and responsive to said attitude error signals for generating ideal wheel speed signals representative of the speed which an ideal, frictionless reaction wheel would attain in response to said attitude error signals;

second subtracting means coupled to said ideal wheel speed simulation means and to said speed quantization correction means, for subtracting said quantization corrected speed signals from said ideal wheel speed signals for generating wheel speed correction signals;

first summing means coupled to said first subtracting means, to said second subtracting means, and to said controllable drive means, for summing together said wheel speed correction signals with said attitude error signals, for generating said drive signals, with a polarity selected for degenerative control.

3. a spacecraft according to claim 2, further comprising first and second compensating means coupled to said first and second subtracting means for compensating said attitude error signals and said wheel speed correction signals, respectively.

4. a spacecraft according to claim 1, wherein said speed quantization correction means( comprises:

noise generating means(254) for generating noise signals;

summing means(252) coupled to said digital speed sensing means(248) and to said noise generating means, for summing said noise signals with said quantized speed signals for generating said dithered wheel speed signals; and low pass filter means (256) coupled to said summing means for low pass filtering said dithered wheel speed signals for generating said quantization corrected speed signals.

5. A method for controlling the attitude of a spacecraft which includes a reaction wheel lying in a control plane, said method comprising the steps of:

sensing the attitude of said spacecraft in said plane;

comparing said attitude of said spacecraft in said plane with a commanded attitude, to produce attitude error signals;

applying said attitude error signals to an ideal reaction wheel simulator, to produce quantized ideal wheel speed signals representative of the speed of said ideal reaction wheel in response to said attitude error signals;

generating quantized reaction wheel speed signals representing the speed of said reaction wheel, said quantized reaction wheel signals being more coarsely quantized than said quantized ideal reaction wheel speed signals;

generating speed error signals representing the difference between said quantized ideal reaction wheel speed signals and said coarsely quantized reaction wheel speed signals;

summing said speed error signals with said attitude error signals to produce reaction wheel drive signals;

driving said reaction wheel in response to said reaction wheel drive signals, to thereby close a degenerative feedback loop for the control of said attitude, whereby said coarse quantization may result in attitude errors;

averaging the steps of said quantized reaction wheel speed signals, to thereby reduce said attitude errors; and wherein said averaging step includes the further steps of:

adding noise signals to said quantized reaction wheel speed signals to produce summed signals;

and low-pass filtering said summed signals.

* * * * *